United States Patent
Sasatani et al.

(10) Patent No.: US 10,934,166 B2
(45) Date of Patent: Mar. 2, 2021

(54) METHOD FOR PRODUCING HYDROGEN FLUORIDE

(71) Applicant: DAIKIN INDUSTRIES, LTD., Osaka (JP)

(72) Inventors: Arata Sasatani, Settsu (JP); Toshiyuki Kinoshita, Settsu (JP); Toshikazu Yoshimura, Settsu (JP); Akikazu Tabuchi, Settsu (JP); Masayoshi Imoto, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/325,361

(22) PCT Filed: Jul. 2, 2015

(86) PCT No.: PCT/JP2015/069127
§ 371 (c)(1),
(2) Date: Jan. 10, 2017

(87) PCT Pub. No.: WO2016/006527
PCT Pub. Date: Jan. 14, 2016

(65) Prior Publication Data
US 2017/0158506 A1  Jun. 8, 2017

(30) Foreign Application Priority Data

Jul. 11, 2014 (JP) .............................. JP2014-143222

(51) Int. Cl.
*C01B 7/19* (2006.01)
*C01B 9/08* (2006.01)

(52) U.S. Cl.
CPC .............. *C01B 7/191* (2013.01); *C01B 7/192* (2013.01); *C01B 9/08* (2013.01)

(58) Field of Classification Search
CPC ............ C01B 7/191; C01B 7/192; C01B 9/08
See application file for complete search history.

(56) References Cited

U.S. PATENT DOCUMENTS

| | | |
|---|---|---|
| 2,932,557 A | 4/1960 | List et al. |
| 3,825,655 A | 7/1974 | Eipeltauer et al. |
| | (Continued) | |

FOREIGN PATENT DOCUMENTS

| | | | |
|---|---|---|---|
| DE | 1040001 | * 10/1958 | ............. C01B 7/192 |
| GB | 2 159 136 A | 11/1985 | |
| | (Continued) | | |

OTHER PUBLICATIONS

Shah et al, "The Effects of Mixing, Reaction Rates, and Stoichiometry on yield for Mixing Sensitive Reactions—Part I: Model Development", International Journal of Chemical Engineering, vol. 2012, 16 pages (taken from https://www.hindawi.com/journals/ijce/2012/750162/) (Year: 2012).*

(Continued)

*Primary Examiner* — Ngoc-Yen Nguyen
(74) *Attorney, Agent, or Firm* — Birch, Stewart, Kolasch & Birch, LLP (57) ABSTRACT

The present invention provides a novel method for producing hydrogen fluoride which can suppress the occurrence of the pasty state over the whole process of producing hydrogen fluoride, reduce the problem of corrosion caused by sulfuric acid, and improve energy efficiency of the process. A method for producing hydrogen fluoride by reacting calcium fluoride and sulfuric acid comprises: (a) mixing and reacting calcium fluoride and sulfuric acid such that a mixture comprising calcium fluoride particles and sulfuric acid substantially maintains a form of particulate to obtain hydrogen fluoride while supplying sulfuric acid to the calcium fluoride particles at a flow rate of 0.002 to 1 mol/min (Continued)

relative to 1 mol of calcium fluoride to such an amount that a molar ratio of sulfuric acid/calcium fluoride is 0.9 to 1.1.

5 Claims, 1 Drawing Sheet (56) References Cited

U.S. PATENT DOCUMENTS

| | | | |
|---|---|---|---|
| 6,355,221 B1* | 3/2002 | Rappas | C01B 7/192 423/158 |
| 2003/0124047 A1* | 7/2003 | Nishimura | B01F 7/00016 423/483 |
| 2011/0206598 A1 | 8/2011 | Grass et al. | |
| 2012/0107223 A1 | 5/2012 | Yoshimura et al. | |

FOREIGN PATENT DOCUMENTS

| | | |
|---|---|---|
| JP | 4-40282 A | 1/1967 |
| JP | 42-652 B1 | 1/1967 |
| JP | 46-5571 B1 | 2/1971 |
| JP | 48-60098 A | 8/1973 |
| JP | 60-115531 U | 8/1985 |
| JP | 4-40282 B2 | 7/1992 |
| JP | 2002-29706 A | 1/2002 |
| JP | 2002-316805 A | 10/2002 |
| JP | 2004-352517 A | 12/2004 |
| JP | 2005-132652 A | 5/2005 |
| JP | 2007-112683 A | 5/2007 |
| JP | 2011-11964 A | 1/2011 |
| JP | 2011-519335 A | 7/2011 |

OTHER PUBLICATIONS

International Search Report, issued in PCT/JP2015/069127, PCT/ISA/210, dated Sep. 29, 2015.
Written Opinion of the International Searching Authority, issued in PCT/JP2015/069127, PCT/ISA/237, dated Sep. 29, 2015.
English translation of International Preliminary Report on Patentability and Written Opinion of the International Searching Authority (PCT/IB/338, PCT/IB/373 and PCT/ISA/237), dated Jan. 26, 2017, for International Application No. PCT/JP2015/069127.
Physical and Colloid Chemistry, "Methodical Guidelines for Students of External Degree Program," Kem TIPP, 2007, p. 35.

* cited by examiner

METHOD FOR PRODUCING HYDROGEN FLUORIDE

TECHNICAL FIELD

The present invention relates to a method for producing hydrogen fluoride, and more particularly relates to a method for producing hydrogen fluoride by reacting calcium fluoride particles with sulfuric acid.

BACKGROUND ART

Industrial methods for producing hydrogen fluoride (HF) generally use a reaction for generating hydrogen fluoride (HF) from fluorite ($CaF_2$) and sulfuric acid ($H_2SO_4$) (see, for example, Patent Literatures 1 to 3). Among such method for producing hydrogen fluoride, there is known a type of method using a jacketed preliminary reactor and an externally heated rotary kiln in combination to conduct two-stage reaction steps. In this type of production method, it is known that three reactions occur through the respective reaction steps in the preliminary reactor and the rotary kiln (see, for example, Patent Literatures 4 and 5). Such a conventional method for producing hydrogen fluoride will be described below with reference to FIG. 1.

Figure 1:
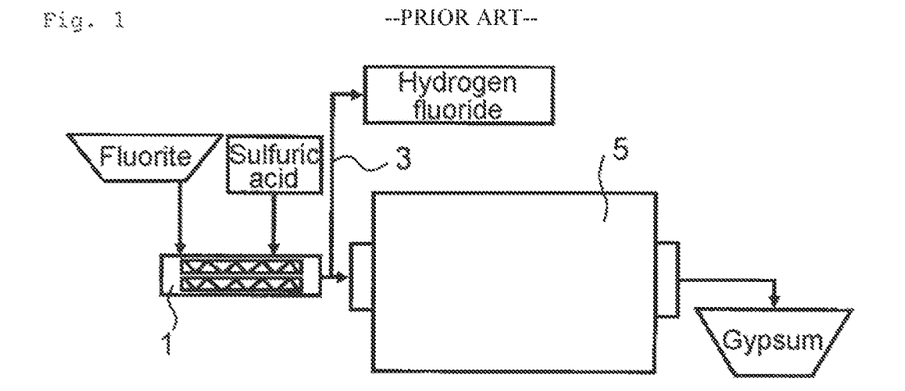
FIG. 1 is a schematic view for explaining the conventional method for producing hydrogen fluoride.

Firstly, fluorite ($CaF_2$) and sulfuric acid ($H_2SO_4$), which has been mixed with oleum and pre-heated to 100° C., are separately supplied to a jacketed preliminary reactor 1 (e.g. biaxial kneader) at substantially equal molar amounts, and a solid-liquid mixture of them is kneaded while being heated at about 100° C. Under such a relatively low temperature condition, a reaction represented by the following formula (1) occurs dominantly.

$$CaF_2 + 2H_2SO_4 \rightarrow Ca(HSO_4)_2 + 2HF \quad (1)$$

A conversion ratio of $CaF_2$ at an outlet port of the preliminary reactor 1 may be 40 to 60%. Hydrogen fluoride (HF) generated by the reaction of the formula (1) is mainly contained in a vapor phase, and taken out through an induction pipe 3. A residual reaction mixture in a clayey-to-particulate state containing calcium hydrogen sulfate ($Ca(HSO_4)_2$) as an intermediate product is transferred to an externally heated rotary kiln 5.

The reaction mixture is heated to an increased temperature in the rotary kiln 5 while the reaction mixture rolls and advances in a direction of a rotation axis. The rotary kiln 5 is heated by flowing hot air at about 500° C. through a jacket. A temperature of the reaction mixture is about 100° C. at an inlet port of the rotary kiln 5 communicating with the preliminary reactor 1, and increased toward an outlet port of the rotary kiln 5 locating at an opposite side thereof, and finally reaches to about 300° C. at the outlet port. Under such a high temperature condition, $Ca(HSO_4)_2$ in the reaction mixture degrades by a reaction of the following formula (2). As a result, $H_2SO_4$ once spent by the reaction of the formula (1) appears again in the form of a liquid substance, and at the same time gypsum ($CaSO_4$) in a solid form is generated as a by-product.

$$Ca(HSO_4)_2 \rightarrow CaSO_4 + H_2SO_4 \quad (2)$$

$H_2SO_4$ generated by the reaction of the formula (2) reacts with unreacted $CaF_2$ existing in the reaction mixture. However, under the high temperature condition as in the rotary kiln 5, not the reaction of the formula (1) but a reaction represented by the following formula (3) occurs dominantly.

$$CaF_2 + H_2SO_4 \rightarrow CaSO_4 + 2HF \quad (3)$$

Hydrogen fluoride (HF) generated by the reaction of the formula (3) is contained in a vapor phase and taken out through the induction pipe 3. A residual reaction mixture mainly contains gypsum ($CaSO_4$) as the by-product, and it is taken out of the outlet port of the rotary kiln 5.

As described above, intended hydrogen fluoride can be obtained by the two-stage reaction steps in the preliminary reactor and the rotary kiln.

PRIOR ART LITERATURE

Patent Literature

Patent Literature 1: U.S. Pat. No. 2,932,557 A
Patent Literature 2: U.S. Pat. No. 3,825,655 A
Patent Literature 3: JP H04-40282 B2
Patent Literature 4: JP 2002-316805 A
Patent Literature 5: JP 2004-352517 A
Patent Literature 6: JP 2005-132652 A
Patent Literature 7: JP 2007-112683 A
Patent Literature 8: JP 2011-11964 A

SUMMARY OF INVENTION

Technical Problem

In the conventional method for producing hydrogen fluoride, while fluorite and sulfuric acid as raw materials are separately supplied to the preliminary reactor, the mixing and the reaction of them are conducted at the same time. Thus, liquid sulfuric acid and solid fluorite supplied as the raw materials, a slurry raw-material mixture of these raw materials, and the reaction mixture in a paste-to-particulate state depending on the progress of the reaction of the formula (1) exist in a mixed state (which is hereinafter referred to as a "first pasty" state) in the preliminary reactor at a temperature of about 100° C., which may be considered as a relatively low temperature, but still high. Since sulfuric acid exists under such a temperature condition, it causes a problem of remarkable corrosion on the preliminary reactor. Furthermore, there is a problem concerning that the solidification of the reacting substance can progress to cause blocking of the apparatus under such a condition.

The reaction mixture taken out of this preliminary reactor is generally in a solid state. When transferred to the rotary kiln, however, it turns into a pasty state again due to the progress of the reaction of the formula (2), and finally in the form of powder due to the progress of the reaction of the formula (3) in addition to the reaction of the formula (2). This phenomenon of turning into a pasty state again (which is hereinafter referred to as a "second pasty" state) occurs by the fact that on transferring from the low temperature condition to the high temperature condition, the reaction of the formula (2) rapidly progresses to generate a large amount of sulfuric acid.

Occurrence of the pasty state (the first and the second pasty state) is not preferable from various viewpoints. The pasty state shows high corrosivity since it contains much sulfuric acid, and as a result it causes a problem of corrosion of the preliminary reactor and the rotary kiln. In particular, the second pasty state shows very high corrosivity since it contains much sulfuric acid under the high temperature condition, and it causes remarkable corrosion of the rotary kiln. Also, occurrence of the pasty state causes a problem in that the pasty reaction mixture adheres to the inner surface of the reactor. Therefore, it is necessary to use a high corrosion resistant material for the apparatuses and set a short cycle for maintenance of the apparatuses. Furthermore, adhering of the pasty substance (or scale forming) causes a problem of reducing an efficiency of heat transfer of the reactor and being unable to attain a stable rotation of the kiln (putting an overload on a drive part of the kiln). Therefore, larger amount of heat energy is required to compensate the reduced efficiency of heat transfer, which results in a large loss of energy.

In order to prevent or reduce the occurrence of the second pasty state, some proposals have been made (see Patent Literatures 4, 5 and 8). Among them, Patent Literature 8 discloses a method for producing hydrogen fluoride which can effectively prevent the occurrence of the second pasty state. Patent Literature 8 describes a method comprising: (a) a step for mixing and reacting calcium fluoride particles having an average particle diameter of 1 to 40 μm with sulfuric acid at a sulfuric acid/calcium fluoride molar ratio of 0.9 to 1.1 under a temperature of 0 to 70° C. to obtain a solid-state reaction mixture; and (b) a step for heating the solid-state reaction mixture to a temperature of 100 to 200° C. to react with itself, and thereby producing hydrogen fluoride in a vapor phase. According to Patent Literature 8, it is possible to prevent the occurrence of the second pasty state in the step (b) by use of the calcium fluoride particles having the average particle diameter of 1 to 40 μm and by conducting the step (a) under the temperature of 0 to 70° C. and the step (b) under the temperature of 100 to 200° C.

An object of the present invention is to provide a novel method for producing hydrogen fluoride which can suppress the occurrence of the pasty state over the whole process for producing hydrogen fluoride, reduce the problem of corrosion due to sulfuric acid, and improve energy efficiency of the process.

Solution to Problem

The present inventors fundamentally reviewed and examined the process for producing hydrogen fluoride, and then focused on the fact that any of the conventional methods start from mixing calcium fluoride with sulfuric acid at equal molar amounts. Such mixture of calcium fluoride and sulfuric acid are generally in the form of slurry or paste. Since this slurry or pasty mixture contains a large amount of sulfuric acid, it is impossible to essentially avoid problems of corrosion and clogging (blocking) when the production of hydrogen fluoride starts from such mixture. In addition, adhesion of the slurry or pasty mixture to the inner surface of the reactor (that is, the occurrence the first pasty state) can cause a reduced efficiency of heat transfer of the reactor and an energy loss. The present inventors tried to fundamentally change the method for mixing the raw materials which involved the occurrence of the first pasty state as. As a result, the present inventors have found that the occurrence of the pasty state can be effectively prevented by use of a mixing method with which sulfuric acid supplied to the reactor is immediately reacted and consumed so that the mixture in the reactor can substantially maintain a form of particulate, and thus the present invention has been completed.

According to the first aspect of the present invention, there is provided a method for producing hydrogen fluoride by reacting calcium fluoride and sulfuric acid, the method comprising:

(a) mixing and reacting calcium fluoride and sulfuric acid such that a mixture comprising calcium fluoride particles and sulfuric acid substantially maintains a form of particulate to obtain hydrogen fluoride while supplying sulfuric acid to the calcium fluoride particles at a flow rate of 0.002 to 1 mol/min relative to 1 mol of calcium fluoride to such an amount that a molar ratio of sulfuric acid/calcium fluoride is 0.9 to 1.1.

When any numeral range is mentioned in the present invention, the range includes the lower and the upper limit values, which also applies hereinafter.

The reaction for generating hydrogen fluoride from calcium fluoride and sulfuric acid is overall represented by the following formula (A).

$$CaF_2 + H_2SO_4 \rightarrow CaSO_4 + 2HF \quad (A)$$

Although the present invention is not bound to any theory, it is assumed that the following elementary reactions occur in effect.

$$CaF_2(s) + 2H_2SO_4(l) \rightarrow Ca(HSO_4)_2(s)^* + 2HF(g) \quad (1)$$

$$*Ca(HSO_4)_2 \cdot nHF(s) \quad (n \leq 2)$$

$$Ca(HSO_4)_2(s) \rightarrow CaSO_4(s) + H_2SO_4(l) \quad (2)$$

$$CaF_2(s) + H_2SO_4(l) \rightarrow CaSO_4(s) + 2HF(g) \quad (3)$$

Any of the reactions of the formulas (1) to (3) are endothermic reactions. In the step (a), one or more of any of the reactions of the formulas (1) to (3) are considered to progress depending on its temperature condition. In this case, the supplied sulfuric acid can be immediately reacted with the calcium fluoride particles and consumed by conducting the mixing with setting the flow rate of sulfuric acid supplied to the calcium fluoride particles to 0.002 to 1 mol/min relative to 1 mol of calcium fluoride. Accordingly, it becomes easy for the mixture to maintain the form of particulate, and as a result the occurrence of the first pasty state and the second pasty state can be effectively suppressed. Depending on the reaction condition, the mixing may be further continued after finishing the supply of sulfuric acid to complete the reaction. Hydrogen fluoride and gypsum as a by-product are obtained by conducting the step (a) in this manner.

According to the second aspect of the present invention, there is provided a method for producing hydrogen fluoride by reacting calcium fluoride and sulfuric acid, the method comprising:

(b) mixing and reacting calcium fluoride and sulfuric acid such that a mixture comprising calcium fluoride particles and sulfuric acid substantially maintains a form of particulate to obtain an intermediate product mixture and hydrogen fluoride while supplying sulfuric acid to the calcium fluoride particles at a flow rate of 0.002 to 1 mol/min relative to 1 mol of calcium fluoride to such an amount that a molar ratio of sulfuric acid/calcium fluoride is 0.9 to 1.1; and (c) mixing and reacting the intermediate product mixture with itself under a temperature condition higher than that in the step (b) to obtain hydrogen fluoride.

The reaction of the formula (1) tends to progress at relatively lower temperature. On the other hand, the reactions of the formulas (2) and (3) are competitive reactions which tend to progress at relatively higher temperature. Since the step (b) is conducted at a relatively lower temperature condition than that of the step (c), the reaction of the formula (1) is considered to occur dominantly in the step (b). In the step b), supplied sulfuric acid can be immediately reacted with the calcium fluoride particles and consumed by conducting the mixing with setting the flow rate of sulfuric acid supplied to the calcium fluoride particles to 0.002 to 1 mol/min relative to 1 mol of calcium fluoride. As a result, hydrogen fluoride and the intermediate product mixture containing generated $Ca(HSO_4)_2$ and unreacted $CaF_2$ at substantially equal molar amounts can be obtained, although it depends on the temperature condition. Since the reaction in the step (b) can progress while the mixture substantially maintains the form of particulate in this manner, the occurrence of the first pasty state can be effectively suppressed.

Since the step (c) is conducted under higher temperature condition than that in the step (b), the reactions of the formulas (2) and (3) are considered to occur dominantly. Sulfuric acid generated by the reaction of the formula (2) immediately reacts with unreacted calcium fluoride in accordance with the reaction of the formula (3) and consumed. As a result, the mixture can substantially maintain the form of particulate. Hydrogen fluoride and gypsum as a by-product are obtained by the step (c). Since the reaction can progress while the mixture substantially maintains the form of particulate in this manner, the occurrence of the second pasty state can be effectively suppressed.

The "fluorite" in the present invention means ores or minerals containing calcium fluoride ($CaF_2$) as a main component, and may be any of those regardless of their locality.

The method for producing hydrogen fluoride of the present invention, in either the first aspect or the second aspect described above, can reduce a problem of corrosion by sulfuric acid since supplied sulfuric acid and sulfuric acid generated by the reaction of the formula (2) are immediately react with the calcium fluoride particles and consumed.

Furthermore, according to the method for producing hydrogen fluoride of the present invention, the occurrence of the pasty state (the first and the second pasty state) can be effectively prevented as described above, and as a result adhering of the pasty substance can be reduced. Therefore, various problems can be substantially solved which are associated with the occurrence of the first and the second pasty state. For example, it becomes possible to improve heat-transfer characteristic of a reaction apparatus and conduct the reactions at lower temperature than that in the conventional methods by reducing the adhesion of the pasty substance. As a result, energy efficiency higher than that in the conventional methods can be accomplished.

As can be seen from the temperature condition in the step (a) or the temperature conditions in the steps (b) and (c), heat energy required for conducting the method for producing hydrogen fluoride according to the present invention is lower than heat energy required for the conventional methods for producing hydrogen fluoride. Thus, the method according to the present invention is energy saving. Also, the method for producing hydrogen fluoride according to the present invention can complete the reactions in a shorter time than the conventional methods since it can reduce energy loss relative to the conventional methods.

The method for producing hydrogen fluoride according to the present invention can be conducted in either continuous or batch manner.

Advantageous Effects of Invention

According to the present invention, there is provided the novel method for producing hydrogen fluoride which can conduct the reactions while substantially maintaining the form of particulate over the whole process and effectively prevent the pasty state (the first and the second pasty state) from occurring.

DESCRIPTION OF EMBODIMENTS

Hereinafter, embodiments of the present invention will be described. The method of the present invention can be conducted in either continuous or batch manner, and the following descriptions apply to both continuous and batch manners unless specified otherwise.

First Embodiment

This embodiment relates to the method for producing hydrogen fluoride in the first aspect of the present invention.

In the method of the first embodiment according to the present invention, any calcium fluoride source can be used for the calcium fluoride particles. The "calcium fluoride particles" in the present invention means particles contain calcium fluoride as a main component. The calcium fluoride particles may be, for example, fluorite or calcium fluoride particles recovered or synthesized by a chemical process or the like (recovered calcium fluoride particles), and may be those subjected to an operation such as purification and/or grinding. In a case of using fluorite as the calcium fluoride particles, fluorite may be of any locality, and may be from China, Mexico, South Africa or others, for example. The calcium fluoride particles have only to contain calcium fluoride as the main component, and may contain impurities such as silicon dioxide ($SiO_2$), calcium carbonate ($CaCO_3$), phosphorous (P), arsenic (As), calcium chloride ($CaCl_2$) and so on. The purity of the calcium fluoride particles is not specifically limited, but preferably more than or equal to 90% by weight, and more preferably more than or equal to 95% by weight. The calcium fluoride particles may be subjected to drying treatment before use.

The reactions of the formulas (1) and (3) have a tendency to have higher reaction rates as a specific surface area of the calcium fluoride particles is larger and/or as a particle diameter of them is smaller. In this embodiment, the specific surface area of the calcium fluoride particles is preferably 0.5 to 30 $m^2/g$. In a case where the specific surface area is within the above-mentioned range, the mixture substantially maintains a form of particulate more easily, and thus the occurrence of the first pasty state and the second pasty state can be effectively prevented. The specific surface area of the calcium fluoride particles is preferably 1 to 10 $m^2/g$, and more preferably 2 to 5 $m^2/g$. In the present specification, the "specific surface area" means a specific surface area obtained by a BET method. In a case of mixing two or more types of calcium fluoride particles, each type of the calcium fluoride particles has only to have a specific surface area of 0.5 to 30 $m^2/g$.

For sulfuric acid, concentrated sulfuric acid such as concentrated sulfuric acid of about 98% or more can be generally used. However, sulfuric acid is not limited thereto. For example, combinations of oleum ($SO_3$ and $H_2SO_4$) and water; sulfur trioxide ($SO_3$) and water; and oleum, sulfur trioxide ($SO_3$) and water can be used to prepare sulfuric acid.

Sulfuric acid and the calcium fluoride particles may be preheated before subjected to the step (a). A preheating temperature can be properly adjusted based on a desired reaction condition. For example, the preheating temperature may be the same as a set temperature of a reactor used in the step (a). The preheating temperature of the calcium fluoride particles and the preheating temperature of sulfuric acid may be the same, and may also be different from one another. Preheating of the calcium fluoride particles and sulfuric acid can increase the reaction rate to facilitate consumption of sulfuric acid.

Step (a)

The calcium fluoride particles and sulfuric acid are mixed and reacted with each other such that the mixture substantially maintains a form of particulate while supplying sulfuric acid to the calcium fluoride particles.

The mixing and the reaction are preferably conducted under a temperature of 0 to 500° C. With the temperature of 0° C. or more, sulfuric acid can maintain a liquid state without freezing. The mixing and the reaction are conducted preferably at 80° C. or more. With the temperature of 80° C. or more, the reaction of the formula (3) occurs dominantly, and hydrogen fluoride and gypsum as a by-product can be obtained without $Ca(HSO_4)_2$ as an intermediate product. In the step (a), however, the reaction of the formula (1) may occur in addition to the reaction of the formula (3), and a part of sulfuric acid may react in accordance with the reaction of the formula (1) to generate hydrogen fluoride and $Ca(HSO_4)_2$ as the intermediate product. Generated $Ca(HSO_4)_2$ degrades by the reaction of the formula (2) to form gypsum and sulfuric acid. Sulfuric acid formed by the reaction of the formula (2) immediately reacts in accordance with the reaction of the formula (3) to obtain hydrogen fluoride and gypsum. The mixing is conducted preferably at 100° C. or more. With the temperature of 100° C. or more, the reaction of the formula (3) can be facilitated. The mixing is conducted further preferably at 170° C. or more. With the temperature of 170° C. or more, the reaction of the formula (3) can be furthermore facilitated. With the temperature of 500° C. or less, thermal degradation and evaporation of sulfuric acid can be prevented. The mixing and the reaction are conducted more preferably at 250° C. or less. With the temperature of 250° C. or less, degradation of sulfuric acid and corrosion of an apparatus can be suppressed more effectively. It is preferable to supply sulfuric acid to the calcium fluoride particles to such an amount that a molar ratio of sulfuric acid/calcium fluoride is 0.9 to 1.1. This makes it possible to react sulfuric acid and calcium fluoride at substantially equal molar amounts to obtain hydrogen fluoride and gypsum as the by-product. Depending on types of impurities in the calcium fluoride particles, for the purpose of compensate consumption of sulfuric acid by the impurities, sulfuric acid and/or $SO_3$ may be charged with an excess amount corresponding to the consumption.

In a case of conducting the method according to this embodiment in a continuous manner, the above-mentioned molar ratio shall be achieved at an outlet port of the reactor.

The calcium fluoride particles and sulfuric acid are mixed and reacted with each other such that the mixture substantially maintains the form of particulate. In the present specification, a mixture in "substantially a form of particulate" means that supplied sulfuric acid and/or sulfuric acid generated by the reaction of the formula (2) immediately react with the calcium fluoride particles to be consumed, thereby the mixture does not turn into slurry form nor paste form. That is, it means that the pasty state (the first pasty state and the second pasty state) does not occur. In the present specification, the "form of particulate" means a mixture of powders with a particle diameter of about several micrometers to about several tens of micrometers and particles with a particle diameter of about several millimeters.

A method for determining whether or not the mixture substantially maintains the form of particulate is not specifically limited, and may be properly selected depending on an embodiment thereof. For example, it can be determined by any one or a combination of two or more of the followings: (i) visual observation; (ii) rapid rise and/or hunting in a torque and/or a current value of a stirring machine used for mixing; and (iii) comparison of a theoretical value of an amount of generated hydrogen fluoride which is calculated based on the amount of sulfuric acid supplied at one time point in the step (a) with the amount of hydrogen fluoride generated at the one time point.

The determination of the form of particulate by visual observation can be conducted by observation of a condition inside the reactor through a viewing window provided on the reactor, for example. The mixture can be determined as substantially maintaining the form of particulate when the mixture in the reactor is in the form of particulate with the solid mixture maintaining a fluidized state and when an adhesive material does not occur on an inner surface, a stirring blade or the like of the reactor.

The determination of the form of particulate by rapid rise and/or hunting in the torque and/or the current value of the stirring machine used for mixing can be conducted by monitoring the torque and/or the current value of the stirring machine, for example. Details of the stirring machine will be described later. In a case where the stirring machine such as the stirring blade is used for mixing, the torque and the current value of the stirring machine are gradually increased with the progress of the reaction as the amount of solid substance in the reactor is increased. However, when the mixture cannot substantially maintain the form of particulate to be in slurry or paste form (that is, when the pasty state occurs), the torque and the current value of the stirring machine rapidly rises, and hunting occurs. These are caused by generated pasty substance and solidified substance formed by further solidification of the pasty substance being stirred and/or crashed. Rapid rise in the torque and/or the current value due to the occurrence of the pasty state significantly deviates from the increase in the torque and/or the current value due to the increased amount of the solid substance. In a case where such rapid rise and/or hunting in the torque and/or the current value are observed, it can be considered that the mixture cannot substantially maintain the form of particulate.

The determination of the form of particulate by comparison of the theoretical value of the amount of generated hydrogen fluoride which is calculated based on the amount of sulfuric acid supplied at one time point in the step (a) with the amount of hydrogen fluoride generated at the one time point can be conducted by the following procedures, for example. As described above, it may be considered that the reaction of the formula (3) can occur dominantly in the step (a) although it depends on the temperature condition. Assuming that the total amount of supplied sulfuric acid immediately reacts with calcium fluoride and consumed in accordance with the formula (3), hydrogen fluoride at a molar amount two times larger than supplied sulfuric acid is theoretically obtained. The theoretical value of the amount of generated hydrogen fluoride at one time point in the step (a) can be calculated based on this assumption. During the step (a), the amount of generated hydrogen fluoride is monitored and compared to the theoretical value. In a case where unreacted sulfuric acid is accumulated, resulting in that the mixture cannot substantially maintain the form of particulate any more (the pasty state occurs), the amount of generated hydrogen fluoride becomes smaller than the theoretical value. Whether or not the pasty state occurs can be determined by the above-mentioned matter. However, since a part of sulfuric acid is considered to react in accordance with the formula (1) in the actual reaction, the amount of actually generated hydrogen fluoride can be smaller than the theoretical value even if the mixture substantially maintains the form of particulate. Time lag on monitoring the amount of generated hydrogen fluoride can also affect a deviation from the theoretical value. Furthermore, a contact between unreacted calcium fluoride and sulfuric acid becomes rate-limiting as the reaction progresses, which can also be a factor in the deviation from the theoretical value. It is necessary to determine whether or not the pasty state occurs in light of these factors.

The methods for the determination by the above-mentioned (i) to (iii) may be used alone or may be used in a combination of the two or more methods. The determination of whether or not the mixture in the reactor is substantially in the form of particulate can be conducted in a more reliable manner by a combination of two or more methods for the determination to make a comprehensive judgement.

The mixing of the calcium fluoride particles and sulfuric acid is conducted under such a condition that the mixture can substantially maintain the form of particulate. A mixing condition is not specifically limited as far as it allows the solid in the reactor to be in the fluidized state, and it can be properly set depending on the temperature condition, a supply rate of sulfuric acid and so on. As the temperature is lower, and as the supply rate of sulfuric acid is higher, it is desired to set a condition with higher mixing property (for example, increase a rotating speed of the stirring machine such as stirring blade). As the mixing property is higher, the reaction of sulfuric acid and the calcium fluoride particles can be facilitated, and the mixture substantially maintains the form of particulate more easily.

The reactor usable in this embodiment is not specifically limited as far as it can feed sulfuric acid and can mix and stir contents thereof, and single-axis or multi-axis externally heated reactor provided with arbitrary and suitable number of stirring blade can be used. More particularly, an externally heated kneading machine provided with one or more stirring blades which can knead high-viscosity material, a ribbon mixer, a planetary mixer, a disk dryer, a super mixer and the like can be used. The reactor preferably has a function of crushing $Ca(HSO_4)_2$ as the intermediate product and gypsum as the by-product as necessary.

The mixing property of the reactor can be evaluated by an attainment degree of mixing. In the present specification, the "attainment degree of mixing" means a value measured in compliance with SAP16-13, which is a standard of the Association of Powder Process Industry and Engineering, JAPAN (APPIE). The attainment degree of mixing can be obtained by mixing calcium carbonate (white) and iron oxide (red) at a weight ratio of 95:5 and determining by a photometer a lightness of samples sampled over time. The attainment degree of mixing "$\eta_j$" for a sample "j" at a mixing time is obtained by the following formula:

$$\eta_j = (y_{max} - y_j)(y_{max} - y_{st})$$

wherein "$y_{max}$" is an output value for calcium carbonate, "$y_j$" is an output value for the sample "j" at the time "t", and "$y_{st}$" is a lightness of a reference mixed powder. The reference mixed powder is a mixed powder in which each powder component is mixed in completely dispersed state at a predetermined blending ratio, and prepared in compliance with the standard SAP16-13. The average value "$\eta$" of the attainment degree of mixing for the whole mixture is represented by the following formula:

$$\eta = \frac{1}{N} \sum_{j=1}^{N} \eta_j$$

"$\eta=1$" indicates that iron oxide is in completely dispersed state.

In this embodiment, the mixing in the step (a) is preferably conducted by use of an apparatus having an attainment degree of mixing of 0.1 or more one minute after a start of the mixing. By use of the apparatus having the attainment degree of mixing of 0.1 or more, the mixture can substantially maintain the form of particulate, and the occurrence of the pasty state can be effectively suppressed. The mixing in the step (a) is more preferably conducted by use of an apparatus having an attainment degree of mixing of 0.2 or more one minute after the start of the mixing. By use of the apparatus having the attainment degree of mixing of 0.2 or more, the occurrence of the pasty state can be suppressed furthermore effectively. Also, the mixing in the step (a) is conducted by use of an apparatus having an attainment degree of mixing of preferably 0.8 or less, and more preferably 0.6 or less one minute after a start of the mixing. By use of the apparatus having the attainment degree of mixing of 0.8 or less, unnecessary dust is prevented from floating in the reactor to be entrained by hydrogen fluoride, and thus, a loss in the raw materials and contamination of the dust in the subsequent step can be prevented. By use of the apparatus having the attainment degree of mixing of 0.6 or less, the above-mentioned entrainment can be prevented furthermore effectively.

Sulfuric acid is supplied at such a rate that the mixture can substantially maintain the form of particulate. In a case where the supply rate of sulfuric acid (and optionally a generation rate of sulfuric acid by the reaction of the formula (2)) falls below a consumption rate of sulfuric acid, the mixture can substantially maintain the form of particulate. However, in a case where the supply rate of sulfuric acid (and optionally the generation rate of sulfuric acid by the reaction of the formula (2)) exceeds the consumption rate of sulfuric acid, the mixture cannot substantially maintain a form of particulate, and thus the pasty state occurs.

In a case of conducting the step (a) in a batch manner, sulfuric acid is preferably supplied at a flow rate of 0.002 to 1 mol/min relative to 1 mol of the calcium fluoride particles, although it depends on mixing property of the apparatus to be used and charged amount of calcium fluoride. With the flow rate of sulfuric acid of 0.002 mol/min or more relative to 1 mol of the calcium fluoride particles, the reaction can be completed in sufficiently short time in practical view. With the flow rate of 1 mol/min or less, the mixture can substantially maintain the form of particulate. The flow rate of sulfuric acid can be properly adjusted depending on the reaction temperature, mixing property of the apparatus to be used and so on. For example, sulfuric acid can be supplied at a flow rate of 0.003 to 0.07 mol/min, and more preferably 0.006 to 0.03 mol/min relative to 1 mol of the calcium fluoride particles. With the flow rate of 0.003 mol/min or more, and more preferably 0.006 mol/min or more relative to 1 mol of the calcium fluoride particles, the reaction can be completed in shorter time. With the flow rate of 0.07 mol/min or less, and more preferably 0.03 mol/min or less, the mixture can substantially maintain the form of particulate more easily. In the present specification, the "flow rate" of sulfuric acid means an average flow rate during sulfuric acid is supplied. Therefore, the flow rate of sulfuric acid may be temporarily out of the above-mentioned range as far as the average flow rate from start to finish of the supply of sulfuric acid is within the above-mentioned range.

Suitable range of the flow rate of sulfuric acid varies particularly depending on the attainment degree of mixing of the apparatus to be used. For example, in a case of using an apparatus having an attainment degree of mixing of about 0.1 one minute after the start of the mixing, it is preferable to supply sulfuric acid at a flow rate of 0.002 to 0.007 mol/min relative to 1 mol of the calcium fluoride particles. In a case of using an apparatus having an attainment degree of mixing of about 0.5 one minute after the start of the mixing, it is preferable to supply sulfuric acid at a flow rate of 0.005 to 0.05 mol/min relative to 1 mol of the calcium fluoride particles. In a case of using an apparatus having an attainment degree of mixing of about 0.7 one minute after the start of the mixing, it is preferable to supply sulfuric acid at a flow rate of 0.017 to 0.2 mol/min relative to 1 mol of the calcium fluoride particles. With the flow rate of sulfuric acid within the above-mentioned ranges, the mixture can substantially maintain the form of particulate, and the pasty state can be effectively prevented from occurring.

Figure 2:
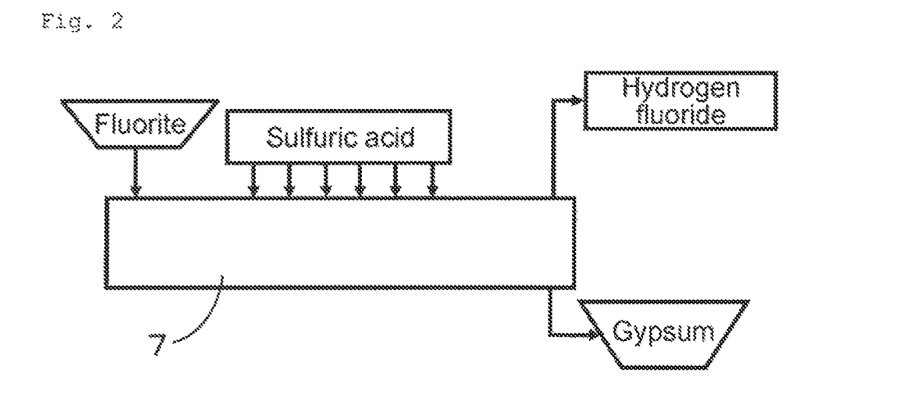
FIG. 2 is a schematic view showing an example of a configuration of a continuous reactor which can be used in the method of the present invention.

The step (a) can be conducted in a continuous reactor. FIG. 2 shows an example of a configuration of the continuous reactor. In this case, the flow rate of supplied sulfuric acid can be properly determined depending on various conditions such as the apparatus to be used and scale of the reaction. For example, the flow rate of supplied sulfuric acid can be set to 0.002 to 1 mol/min. By setting the flow rate in this manner, the reaction can be completed in sufficiently short time in practical view, and also the mixture can substantially maintain the form of particulate. In a case where the method for producing hydrogen fluoride according to this embodiment is conducted in the continuous reactor, each of sulfuric acid and the calcium fluoride particles is continuously supplied to the reactor in the step (a) in such a manner that the molar ratio of sulfuric acid/calcium fluoride at an outlet port of the reactor is preferably 0.9 to 1.1. A residence time in the step (a) can be properly adjusted depending on the type of the apparatus to be used and/or the reaction condition. The residence time in the step (a) is preferably 1 to 600 minutes. With the residence time within the above-mentioned range, the reaction can progress while the mixture substantially maintains the form of particulate. The residence time is more preferably 15 to 300 minutes and furthermore preferably 30 to 180 minutes. Sulfuric acid is continuously supplied over the entire residence time. For example, in a case of conducting the step (a) by use of the continuous reactor 7 as shown in FIG. 2, sulfuric acid can be supplied at a plurality of points along a moving direction of the mixture in the reactor. In a case of supplying sulfuric acid at a plurality of point in this manner, total flow rate of the supplied sulfuric acid is preferably within the above-mentioned numerical range. However, sulfuric acid may also be supplied at one point as is the case with the calcium fluoride particles.

In the step (a), the mixing may be further continued after finishing the supply of sulfuric acid. By continuing the mixing in this manner, the reactions of the formulas (1) to (3) can be completed. The completion of the reactions of the formulas (1) to (3) can be confirmed by the fact that the generation of hydrogen fluoride is substantially stopped. As described above, any one or more of the reactions of the formulas (1) to (3) are considered to occur in the step (a) depending on the reaction condition. Therefore, a part of sulfuric acid may be reacted in accordance with the formula (1) to generate hydrogen fluoride and $Ca(HSO_4)_2$. As a result, at a time point when the supply of sulfuric acid in the step (a) is completed, small amounts of $Ca(HSO_4)_2$ as the intermediate product and unreacted $CaF_2$ in addition to gypsum as the by-product may be present in the reactor depending on the reaction condition. By further continuation of the mixing after completing the supply of sulfuric acid, this $Ca(HSO_4)_2$ is reacted in accordance with the formula (2), and then sulfuric acid generated thereby can be reacted with unreacted $CaF_2$ in accordance with the formula (3) to form hydrogen fluoride. In this case, with the calcium fluoride particles having sufficiently large specific surface area (for example, a specific surface area of 0.5 to 30 $m^2/g$), the reaction rate of the formula (3) is higher than that of the formula (2). Thus, sulfuric acid generated by the reaction of the formula (2) is immediately reacted with the unreacted calcium fluoride particles and consumed, and thus the mixture can substantially maintain the form of particulate more easily. In a case of conducting this further mixing, mixing time is preferably 1 to 300 minutes, more preferably 1 to 120 minutes, and furthermore preferably 1 to 60 minutes. The reactions of the formulas (1) to (3) can be substantially completed by setting the mixing time in this manner. In a case of conducting this further mixing, heating may be conducted simultaneously in order to further facilitate the progress of the reactions.

In a case where the step (a) is conducted in the continuous reactor 7 shown in FIG. 2, for example, sulfuric acid may be supplied up to a particular position along the moving direction of the mixture, and then the mixture may be further mixed up to the outlet port of the reactor 7.

A reactor usable in a case where the step (a) is conducted in the continuous reactor is not specifically limited as far as it can supply sulfuric acid at a predetermined flow rate. The continuous reactor is preferably a reactor which can be externally heated and is less likely to discharge unreacted substance due to short path. Equipment cost can be reduced by use of such reactor, and thus hydrogen fluoride can be continuously generated in high yield. The following reactors can be used as the continuous reactor: a reactor having stirring function which can achieve a predetermined attainment degree of mixing and a function to extrude the mixture in the reactor forward; a plurality of such reactors connected to each other; an extruder connected to a stirring apparatus which can achieve a predetermined attainment degree of mixing; an extruder connected to a plurality of stirring apparatuses which can achieve a predetermined attainment degree of mixing and so on.

The supply rate of sulfuric acid may be constant over the step (a), may be intermittent, or may vary with time.

In a case where the step (a) is conducted in the continuous reactor, the continuous reactor has an advantage that the amount of generated hydrogen fluoride does not pulsate compared to a batch reactor, and thus, the subsequent purification step can be conducted in a stable manner. In addition, the continuous reactor can achieve downsizing of the apparatus compared to the batch reactor. Furthermore, since it has no risk of clogging of raw-material charging valve, discharging valve of generated gypsum and the like, the apparatus can be operated in a stable manner, and thus the continuous production of hydrogen fluoride can be efficiently conducted.

As described above, the pasty state can be effectively prevented from occurring, the reaction can progress while the mixture substantially maintains the form of particulate, and thus hydrogen fluoride can be obtained in a vapor phase. The remaining reaction mixture is in the form of particulate and mainly contains gypsum as the by-product. A conversion ratio of $CaF_2$ at this time can reach 90% or more, and preferably 95% or more, although it depends on the specific reaction condition. Hydrogen fluoride is preferably recovered to be purified and separated as a target product.

In this embodiment, the mixture can substantially maintain the form of particulate in the step (a) by adjusting the supply rate of sulfuric acid, and thus the pasty state can be prevented from occurring. Thus, mechanical scraping or the like for removing the pasty substance adhering to the inside of the reactor is not required. In addition, the reduction in efficiency of heat transfer due to the pasty substance adhering to the inner surface of the reactor can be prevented, and a time required for the reaction is drastically reduced. As a whole, energy cost can be drastically reduced. In addition, since supplied sulfuric acid immediately reacts with the calcium fluoride particles and consumed, corrosion risk by sulfuric acid can be suppressed. In addition, since reduction in efficiency of heat transfer due to adhering of the pasty substance can be prevented as described above, the reaction temperature can be set lower compared to the conventional method by selecting an apparatus having good heat-transfer characteristics. Corrosion can be furthermore suppressed by setting the reaction temperature lower. Therefore, apparatus cost for preventing corrosion can be reduced.

Second Embodiment

This embodiment relates to a method for producing a hydrogen fluoride according to the second aspect of the present invention. Hereinafter, explanations of this embodiment shall be made with a focus on differences from the first embodiment, and the same explanations as those in the first embodiment apply to the second embodiment unless described otherwise.

In this embodiment, the same calcium fluoride particles and sulfuric acid as those in the first embodiment can be used. The calcium fluoride particles and sulfuric acid may be preheated or precooled to a predetermined temperature before subjected to the step (b). The preheating or precooling temperature can be properly adjusted based on a desired reaction condition, and may be the same temperature as the set temperature of a reactor used in the step (b). The preheating or precooling temperature of the calcium fluoride particles may be the same as or different from the preheating or precooling temperature of sulfuric acid.

Step (b)

The calcium fluoride particles and sulfuric acid are mixed and reacted with each other such that the mixture substantially maintains a form of particulate while supplying sulfuric acid to the calcium fluoride particles.

The mixing and the reaction in the step (b) are preferably conducted under a temperature of 0 to 170° C. With the temperature of 0° C. or more, sulfuric acid can maintain a liquid state without freezing. The mixing and the reaction are conducted more preferably at 50° C. or more. With the temperature of 50° C. or more, the reaction rate can be increased to the extent that the mixture can substantially maintain a form of particulate. In a case where the mixing and the reaction are carried out at 80° C. or less, the reaction shown in the formula (1) occurs dominantly. It is preferable to supply sulfuric acid to the calcium fluoride particles to such an amount that a molar ratio of sulfuric acid/calcium fluoride is 0.9 to 1.1. This allows the calcium fluoride at a molar amount about two times larger than the stoichiometric amount in the reaction of the formula (1) to exist. Therefore, the whole of the supplied sulfuric acid is reacted, an intermediate product mixture and hydrogen fluoride are obtained, and the intermediate product mixture contains unreacted calcium fluoride at about one time molar amount. Depending on types of impurities in the calcium fluoride particles, for the purpose of compensate consumption of sulfuric acid by the impurities, sulfuric acid and/or $SO_3$ may be charged with an excess amount corresponding to the consumption.

In a case of conducting the method according to this embodiment in a continuous manner, the above-mentioned molar ratio shall be achieved at an outlet port of the reactor.

The calcium fluoride particles and sulfuric acid are mixed and reacted with each other such that the mixture substantially maintains a form of particulate. As a method for determining whether or not the mixture substantially maintains a form of particulate, the same methods as those in the first embodiment can be used. For example, the determination can be carried out by any one or a combination of two or more of the followings: (i) visual observation; (ii) rapid rise and/or hunting in a torque and/or a current value of a stirring machine used for mixing; and (iii) comparison of a theoretical value of an amount of generated hydrogen fluoride which is calculated based on the amount of sulfuric acid supplied at one time point in the step (b) with an amount of hydrogen fluoride generated at the one time point. The determinations of the form of particulate based on the above-mentioned (i) visual observation and (ii) a change rate in a torque of the stirring machine used for mixing can be conducted by the same procedures as those in the first embodiment.

The determination of the form of particulate by comparison of a theoretical value of an amount of generated hydrogen fluoride which is calculated based on the amount of sulfuric acid supplied at one time point in the step (b) with an amount of hydrogen fluoride generated at the one time point can be conducted by the following procedures, for example. As described above, the reaction of the formula (1) occurs dominantly in the step (b). Assuming that the total amount of the supplied sulfuric acid is immediately reacted with calcium fluoride and consumed in accordance with the formula (1), hydrogen fluoride of equal molar amount of the supplied sulfuric acid is theoretically obtained. Based on this assumption, the theoretical value of the amount of generated hydrogen fluoride at one time point in the step (b) can be calculated. During the step (b), the amount of generated hydrogen fluoride is monitored and compared to the above-mentioned theoretical value. In a case where unreacted sulfuric acid is accumulated and where the mixture cannot substantially maintain a form of particulate (the first pasty state occurs), the amount of generated hydrogen fluoride becomes smaller than the theoretical value. It is possible to determine whether or not the first pasty state occurs by this. However, since a part of sulfuric acid is considered to be reacted in accordance with the formula (3) depending on the actual reaction condition, the amount of actually generated hydrogen fluoride can be smaller than the theoretical value even if the mixture substantially maintains a form of particulate. Time lag on monitoring the amount of generated hydrogen fluoride can also affect a deviation from the theoretical value. Furthermore, the contact between unreacted calcium fluoride and sulfuric acid becomes rate-limiting as the reaction progresses, which can be a factor in the deviation from the theoretical value. It is necessary to determine whether or not the first pasty state occurs in light of these factors.

The methods for the determination by the above-mentioned (i) to (iii) may be used alone or may be used in a combination of the two or more methods. The determination of whether or not the mixture in the reactor substantially maintains a form of particulate can be conducted in a more reliable manner by using the two or more methods for the determination in combination.

The mixing of the calcium fluoride particles and sulfuric acid is conducted preferably under such a condition that the mixture can substantially maintain a form of particulate. Details of the mixing condition are the same as those described in the first embodiment. In this embodiment, the same reactor as that in the first embodiment can be used.

In this embodiment, the mixing in the step (b) is preferably conducted by use of an apparatus having an attainment degree of mixing of 0.1 or more one minute after a start of the mixing. By use of the apparatus having an attainment degree of mixing of 0.1 or more, the mixture can substantially maintain a form of particulate, and occurrence of the pasty state can be effectively suppressed. The mixing in the step (b) is more preferably conducted by use of an apparatus having an attainment degree of mixing of 0.2 or more one minute after a start of the mixing. By use of the apparatus having an attainment degree of mixing of 0.2 or more, occurrence of the pasty state can be suppressed furthermore effectively. Also, the mixing in the step (b) is conducted by use of an apparatus having an attainment degree of mixing of preferably 0.8 or less, and more preferably 0.6 or less one minute after a start of the mixing. By use of the apparatus having an attainment degree of mixing of 0.8 or less, unnecessary dust is prevented from floating in the reactor to be entrained by hydrogen fluoride, and thus, a loss in the raw materials and contamination of the dust in the subsequent step can be prevented. By use of the apparatus having an attainment degree of mixing of 0.6 or less, the above-mentioned entrainment can be prevented furthermore effectively.

Sulfuric acid is supplied at such a rate that the mixture can substantially maintain a form of particulate. In a case where a supply rate of sulfuric acid falls below a consumption rate of sulfuric acid, the mixture can substantially maintain a form of particulate. However, in a case where a supply rate of sulfuric acid exceeds a consumption rate of sulfuric acid, the mixture cannot substantially maintain a form of particulate to generate a first pasty state.

In a case of conducting the step (b) in a batch manner, sulfuric acid is preferably supplied at a flow rate of 0.002 to 1 mol/min relative to 1 mol of the calcium fluoride particles, although it depends on mixing property of an apparatus to be used and charged amount of the calcium fluoride. With the flow rate of sulfuric acid of 0.002 mol/min or more relative to 1 mol of the calcium fluoride particles, the reaction can be completed in sufficiently short time from a practical viewpoint. With the flow rate of sulfuric acid of 1 mol/min or less relative to 1 mol of the calcium fluoride particles, the mixture can substantially maintain a form of particulate. The flow rate of sulfuric acid can be properly adjusted depending on the reaction temperature, mixing property of the apparatus to be used and the like. For example, sulfuric acid can be supplied at a flow rate of 0.003 to 0.07 mol/min, and more preferably 0.006 to 0.03 mol/min relative to 1 mol of the calcium fluoride particles. With the flow rate of 0.003 mol/min or more, and more preferably 0.006 mol/min or more relative to 1 mol of the calcium fluoride particles, the reaction can be completed in shorter time. With the flow rate of 0.07 mol/min or less, and more preferably 0.03 mol/min or less relative to 1 mol of the calcium fluoride particles, the mixture can substantially maintain a form of particulate more easily. In the present specification, the "flow rate" of sulfuric acid means an average flow rate during sulfuric acid is supplied. Therefore, the flow rate of sulfuric acid may be temporarily out of the above-mentioned range as far as the average flow rate from start to finish of the supply of sulfuric acid is within the above-mentioned range.

Suitable range of the flow rate of sulfuric acid varies depending on particularly an attainment degree of mixing of an apparatus to be used. For example, in a case of using an apparatus having an attainment degree of mixing of about 0.1 one minute after a start of the mixing, it is preferable to supply sulfuric acid at a flow rate of 0.002 to 0.007 mol/min relative to 1 mol of the calcium fluoride particles. In a case of using an apparatus having an attainment degree of mixing of about 0.5 one minute after a start of the mixing, it is preferable to supply sulfuric acid at a flow rate of 0.005 to 0.05 mol/min relative to 1 mol of the calcium fluoride particles. In a case of using an apparatus having an attainment degree of mixing of about 0.7 one minute after a start of the mixing, it is preferable to supply sulfuric acid at a flow rate of 0.017 to 0.2 mol/min relative to 1 mol of the calcium fluoride particles. With the flow rate of sulfuric acid within the above-mentioned ranges, the mixture can substantially maintain a form of particulate, and the pasty state can be effectively prevented from occurring.

The step (b) can be conducted in a continuous reactor. In this case, the flow rate of the supplied sulfuric acid can be properly determined depending on various conditions such as an apparatus to be used and scale of the reaction. For example, the flow rate of the supplied sulfuric acid can be set to 0.002 to 1 mol/min. By setting the flow rate in this manner, the reaction can be completed in sufficiently short time from a practical viewpoint, and the mixture can substantially maintain a form of particulate. In a case where the method for producing hydrogen fluoride according to this embodiment is carried out in a continuous reactor, sulfuric acid and calcium fluoride particles are continuously supplied to the reactor, respectively in the step (b) in such a manner that the molar ratio of sulfuric acid/calcium fluoride at an outlet port of the reactor is preferably 0.9 to 1.1. A residence time in the step (b) can be properly adjusted depending on the type of the apparatus to be used and/or reaction condition. The residence time in the step (b) is preferably 1 to 600 minutes. With the residence time within the above-mentioned range, the reaction can progress while the mixture substantially maintains a form of particulate. The residence time is more preferably 15 to 300 minutes and furthermore preferably 30 to 180 minutes. Sulfuric acid is continuously supplied over the entire residence time. For example, in a case of conducting the step (b) by use of the continuous reactor 7 as shown in FIG. 2, sulfuric acid can be supplied at a plurality of points along a moving direction of the mixture in the reactor. In a case of supplying sulfuric acid at a plurality of point in this manner, total flow rate of the supplied sulfuric acid is preferably within the above-mentioned numerical range. However, sulfuric acid may also be supplied at one point as is the case with the calcium fluoride particles.

In the step (b), the continuous reactor usable in the step (a) of the first embodiment can be used in the same manner.

In a case where the step (b) is carried out in a continuous reactor, the continuous reactor has an advantage that the amount of generated hydrogen fluoride does not pulsate compared to a batch reactor, and thus the subsequent purification step can be conducted in a stable manner. In addition, the continuous reactor can achieve downsizing of the apparatus compared to the batch reactor. Furthermore, since it has no risk of clogging of raw-material charging valve, discharging valve of generated gypsum and the like, the apparatus can be operated in a stable manner and the continuous production of hydrogen fluoride can be efficiently conducted.

The supply rate of sulfuric acid may be constant over the step (b), may be intermittent, or may vary with time.

As described above, the first pasty state can be effectively prevented from occurring, and the reaction can progress while the mixture substantially maintains a form of particulate. Thus, the intermediate product mixture in the form of particulate and hydrogen fluoride can be obtained. The intermediate product mixture contains $Ca(HSO_4)_2$ as the intermediate product and unreacted $CaF_2$ at approximately equal molar ratio. The conversion ratio of $CaF_2$ in this case can be 50%±10%, although it depends on a specific reaction condition. The intermediate product mixture may also contain small amount of gypsum ($CaSO_4$) derived from the reaction shown in the formula (3). Generated hydrogen fluoride may exist in the vapor phase, or may also exist in the solid mixture. Hydrogen fluoride existing in the vapor phase is preferably recovered to be purified and separated as a target product.

Step (c)

The intermediate product mixture in a form of particulate obtained by the step (b) is mixed and reacted with itself in the step (c) under a temperature condition higher than that in the step (b). The mixing and the reaction in the step (c) are preferably conducted at a temperature of 80 to 500° C. With the temperature of 80° C. or more, hydrogen fluoride can be obtained in vapor phase at sufficient evaporation rate. The heating temperature is preferably 90° C. or more, and more preferably 100° C. or more. With the temperature of 90° C. or more, the reaction of the formula (3) can be facilitated. With the temperature of 100° C. or more, the reaction is furthermore facilitated. The heating temperature is furthermore preferably 170° C. or more. With the temperature of 170° C. or more, the reaction of the formula (3) can be furthermore facilitated. With the heating temperature of 500° C. or less, thermal degradation and evaporation of sulfuric acid can be prevented. Under this temperature condition, the reactions of the formulas (2) and (3) occur dominantly. Sulfuric acid generated by the reaction of the formulas (2) is immediately reacted with unreacted calcium fluoride particles existing in the mixture and consumed. As a result, the mixture can maintain a form of particulate as a whole without the occurrence of pasty adhesive material (that is, without the occurrence of the second pasty state). The mixing and the reaction are conducted more preferably at 250° C. or less. With the temperature of 250° C. or less, degradation of sulfuric acid and the corrosion of the apparatus can be suppressed more effectively. In this case, with the calcium fluoride particles having a specific surface area of 0.5 to 30 m²/g, the reaction rate of the formula (3) is higher than that of the formula (2). Thus, the occurrence of the second pasty state can be suppressed more effectively. It is not preferably to actively mix (or stir) the reaction mixture during the step (c) since unnecessary dust may float in the vapor phase to be entrained by hydrogen fluoride. However, the reaction mixture may also be mixed (or stirred) in a case where the gypsum as a by-product is desired to be obtained in a fluidized (powdery) state.

Alternatively, the generation of the second pasty state can also be prevented by recycling in the reactor the gypsum formed as the by-product.

The mixing time in the step (c) may be 10 to 60 minutes, for example. With the mixing time of 10 or more minutes, hydrogen fluoride can be sufficiently reacted and evaporated. With the mixing time of 60 minutes or less, the scale of the apparatus can avoid becoming excessive. Accordingly, generated hydrogen fluoride is obtained in a vapor phase. Hydrogen fluoride is preferably purified and separated as a target product.

The step (c) can be conducted in a continuous reactor. In this case, a residence time in the step (c) is preferably 1 to 300 minutes, more preferably 1 to 120 minutes, for example. By setting the residence time in this manner, the reaction in the step (c) can be substantially completed. A reactor usable in a case of conducting the step (c) in a continuous reactor is not specifically limited. However, a reactor which can be externally heated and is less likely to discharge unreacted substance due to short path is preferable. By use of such reactor, equipment cost can be reduced and hydrogen fluoride can be continuously generated in high yield. In a case where the steps (b) and (c) are carried out in the continuous reactor, the steps (b) and (c) may be conducted in a single reactor. For example, in a case of using the reactor 7 as shown in FIG. 2, the temperature condition of the step (b) is set to a particular position along a moving direction of the mixture, and the temperature condition of the step (c) is set from the particular position to the outlet port of the reactor 7. Such temperature setting allows the reactions in the steps (b) and (c) to be continuously conducted. Alternatively, the steps (b) and (c) may be conducted in separate reactors. In this case, each of the steps (b) and (c) may be conducted in a single reactor, or may also be conducted in a plurality of reactors connected with each other.

Thus, hydrogen fluoride can be obtained in the vapor phase while effectively preventing the generation of the second pasty state. The remaining reaction mixture is in the form of particulate and can mainly contain the gypsum as the by-product. The conversion ratio of $CaF_2$ at this time can reach 90% or more, and preferably 95% or more, although it depends on a specific reaction condition.

In this embodiment, the mixture can substantially maintain a form of particulate in both of the steps (b) and (c) by adjusting the supply rate of sulfuric acid, and thus the first and the second pasty state can be prevented from occurring. Thus, mechanical scraping or the like for removing the pasty substance adhering to the inside of the reactor is not required. In addition, the reduction in efficiency of heat transfer due to the pasty substance adhering to the inner surface of the reactor can be prevented, and a time required for the reaction is drastically reduced. As a whole, energy cost can be drastically reduced. In addition, since the supplied sulfuric acid is immediately reacted with the calcium fluoride particles and consumed, corrosion risk by sulfuric acid can be suppressed. In addition, since reduction in efficiency of heat transfer due to adhering of the paste can be prevented as described above, the reaction temperature can be set lower compared to the conventional method by selecting an apparatus having good heat-transfer characteristics. Corrosion can be further suppressed by setting the reaction temperature lower. Therefore, apparatus cost for preventing corrosion can be reduced.

EXAMPLES

Example 1

This Example relates to the method for producing hydrogen fluoride according to the first aspect of the present invention.

In this Example, a tank reactor with a volume of 2 L having a stirring blade (hereinafter also referred to as a "reactor A") was used as a reactor. The reactor had a viewing window provided thereon, and a condition inside the reactor could be observed through the viewing window.

Firstly, the attainment degree of mixing for the reactor A was evaluated based on SAP16-13, which was the standard of the Association of Powder Process Industry and Engineering, JAPAN (APPIE). Calcium carbonate (white) with an average particle diameter of 3 μm and iron oxide (red) with an average particle diameter of 0.7 μm were mixed with each other at a weight ratio of 95:5 with a circumferential velocity of 2.5 m/s. The lightness of the mixture one minute after the start of the mixing was determined by a photometer. According to the evaluation of the attainment degree of mixing based on the determined lightness, the attainment degree of mixing of the reactor A one minute after the start of the mixing was about 0.7.

Step (a)

Fluorite with an average particle diameter of 10 μm and a specific surface area of 1 m$^2$/g was used as calcium fluoride (CaF$_2$) particles. 500 g (6.40 mol) of the calcium fluoride particles were put into the reactor, the reactor temperature was set to 120° C., and fluorite was preheated to the set temperature of the reactor.

While supplying 625 g (6.37 mol) of sulfuric acid, which had been preheated to 120° C. separately, to the reactor at a flow rate of 31.25 g/min (0.05 mol/min relative to 1 mol of the calcium fluoride particles), calcium fluoride and sulfuric acid were stirred and mixed with each other. It may be allowed to consider the mixing temperature as the set temperature of the reactor (that is, 120° C.).

The condition inside the reactor was observed visually through the viewing window provided on the reactor. Simultaneously, an amount of generated hydrogen fluoride, as well as a torque and a current value of the stirring blade were monitored. It was visually confirmed that the mixture maintained a solid (that is, granular) state, causing no occurrence of pasty state inside the reactor during the step (a). Also, rapid rise and hunting in the torque and the current value of the stirring blade were not observed during the step (a). In addition, as a result of monitoring the amount of generated hydrogen fluoride, it was confirmed that the amount of generated hydrogen fluoride during the step (a) was 99% of the theoretical value. Based on the above-mentioned results, it was determined that the mixture substantially maintained the form of particulate during the step (a).

The supply of sulfuric acid was completed 20 minutes after the start of supplying. At a time point when the supply of sulfuric acid was completed, the conversion ratio of calcium fluoride was calculated to 75%, and the mixture was in the form of particulate. When the stirring was subsequently continued at 120° C. even after the supply of sulfuric acid was completed, hydrogen fluoride was generated and the mixture substantially maintained the form of particulate. The generation of hydrogen fluoride was stopped 45 minutes after completion of the supply of sulfuric acid. At this time point, the conversion ratio of calcium fluoride was calculated to 98%.

Example 2

This Example is a modified example of Example 1, and used the respective raw materials at amounts two times larger than those in Example 1.

This Example was conducted by use of the same reactor as that used in Example 1 (reactor A).

Step (a)

The same fluorite as that used in Example 1 was used as the calcium fluoride (CaF$_2$) particles. 1,000 g (12.8 mol) of the calcium fluoride particles was put into the reactor, the reactor temperature was set to 120° C., and fluorite was preheated to the set temperature of the reactor.

While supplying 1250 g (12.7 mol) of sulfuric acid, which had been preheated to 120° C. separately, to the reactor at a flow rate of 25 g/min (0.02 mol/min relative to 1 mol of the calcium fluoride particles), calcium fluoride and sulfuric acid were stirred and mixed with each other. It may be allowed to consider the mixing temperature as the set temperature of the reactor (that is, 120° C.)

The condition inside the reactor was observed visually through the viewing window provided on the reactor. Simultaneously, the amount of generated hydrogen fluoride, as well as the torque and the current value of the stirring blade were monitored. It was visually confirmed that the mixture maintained the solid (that is, granular) state, causing no occurrence of the pasty state inside the reactor during the step (a). Also, rapid rise and hunting in the torque and the current value of the stirring blade were not observed during the step (a). In addition, as a result of monitoring the amount of generated hydrogen fluoride, it was confirmed that the amount of generated hydrogen fluoride during the step (a) was 99% of the theoretical value. Based on the above-mentioned results, it was determined that the mixture substantially maintained the form of particulate during the step (a).

The supply of sulfuric acid was completed 50 minutes after the start of supplying. At the time point when the supply of sulfuric acid was completed, the conversion ratio of calcium fluoride was calculated to 75%, and the mixture was in the form of particulate. When the stirring was subsequently continued at 120° C. even after the supply of sulfuric acid was completed, hydrogen fluoride was generated and the mixture substantially maintained the form of particulate. The generation of hydrogen fluoride was stopped 50 minutes after completion of the supply of sulfuric acid. At this time point, the conversion ratio of calcium fluoride was calculated to 98%.

Example 3

This Example relates to the method for producing hydrogen fluoride according to the second aspect of the present invention.

This Example was conducted by use of the same reactor as that used in Example 1 (reactor A).

Step (b)

The same fluorite as that used in Example 1 was used as the calcium fluoride (CaF$_2$) particles. 1,000 g (12.8 mol) of the calcium fluoride particles was put into the reactor, the reactor temperature was set to 80° C., and fluorite was preheated to the set temperature of the reactor.

While supplying 1250 g (12.7 mol) of sulfuric acid, which had been preheated to 80° C. separately, to the reactor at a flow rate of 25 g/min (0.02 mol/min relative to 1 mol of the calcium fluoride particles), calcium fluoride and sulfuric acid were stirred and mixed with each other. It may be allowed to consider the mixing temperature as the set temperature of the reactor (that is, 80° C.).

The condition inside the reactor was observed visually through the viewing window provided on the reactor. Simultaneously, the amount of generated hydrogen fluoride, as well as the torque and the current value of the stirring blade were monitored. It was visually confirmed that the mixture maintained the solid (that is, granular) state, causing no occurrence of the pasty state inside the reactor during the step (b). Also, rapid rise and hunting in the torque and the current value of the stirring blade were not observed during the step (b). In addition, as a result of monitoring the amount of generated hydrogen fluoride, it was confirmed that the amount of generated hydrogen fluoride during the step (b) was 99% of the theoretical value. Based on the above-mentioned results, it was determined that the mixture substantially maintained the form of particulate during the step (b).

The supply of sulfuric acid was completed 50 minutes after the start of supplying. At this time point, the conversion ratio of calcium fluoride was calculated to 50%.

Step (c)

Then, the set temperature of the reactor was increased to 130° C., and the intermediate product mixture was mixed and reacted with itself. It was visually confirmed that the mixture maintained the solid (that is, granular) state, causing no occurrence of adhesive material inside the reactor during the step (c).

The generation of hydrogen fluoride was stopped 40 minutes after the start of the step (c). At this time point, heating and stirring were completed. The conversion ratio of calcium fluoride was calculated to 98% based on the amount of generated hydrogen fluoride.

Example 4

This Example is a modified example of Example 3, in which the flow rate of sulfuric acid was increased.

This Example was conducted by use of the same reactor as that used in Example 1 (reactor A).

Step (b)

The step (b) was conducted in accordance with the same procedures as those in Example 3 except that the flow rate of sulfuric acid was 62.5 g/min (0.05 mol/min relative to 1 mol of the calcium fluoride particles). It was visually confirmed that the mixture maintained the solid (that is, granular) state, causing no occurrence of the pasty state inside the reactor during the step (b). Also, rapid rise and hunting in the torque and the current value of the stirring blade were not observed during the step (b). In addition, as a result of monitoring the amount of generated hydrogen fluoride, it was confirmed that the amount of generated hydrogen fluoride during the step (b) was 99% of the theoretical value. Based on the above-mentioned results, it was determined that the mixture substantially maintained the form of particulate during the step (b).

The supply of sulfuric acid was completed 20 minutes after the start of supplying. At this time point, the conversion ratio of calcium fluoride was calculated to 40%.

Step (c)

Then, the step (c) was conducted in accordance with the same procedures as those in Example 3. It was visually confirmed that the mixture maintained the solid (that is, granular) state, causing no occurrence of adhesive material inside the reactor during the step (c).

The generation of hydrogen fluoride was stopped 100 minutes after the start of the step (c). At this time point, heating and stirring were completed. The conversion ratio of calcium fluoride was calculated to 98% based on the amount of generated hydrogen fluoride.

Example 5

This Example is a modified example of Example 3, and used a tank reactor (hereinafter also referred to as a "reactor B") with a volume of 2 L having a stirring blade which is smaller in size and has lower mixing property than the stirring blade used in Example 3 as a reactor.

Firstly, the attainment degree of mixing for the reactor B was evaluated based on SAP16-13, which was the standard of the Association of Powder Process Industry and Engineering, JAPAN (APPIE). Calcium carbonate (white) with an average particle diameter of 3 μm and iron oxide (red) with an average particle diameter of 0.7 μm were mixed at a weight ratio of 95:5 with a circumferential velocity of 0.6 m/s. The lightness of the mixture one minute after the start of the mixing was determined by the photometer. According to the evaluation of the attainment degree of mixing based on the determined lightness, the attainment degree of mixing of the reactor B one minute after the start of the mixing was about 0.1.

Step (b)

The step (b) was conducted in accordance with the same procedures as those in Example 3 except that the flow rate of sulfuric acid was 8.3 g/min (0.007 mol/min relative to 1 mol of the calcium fluoride particles). It was visually confirmed that the mixture maintained the solid (that is, granular) state, causing no occurrence of the pasty state inside the reactor during the step (b). Also, rapid rise and hunting in the torque and the current value of the stirring blade were not observed during the step (b). In addition, as a result of monitoring the amount of generated hydrogen fluoride, it was confirmed that the amount of generated hydrogen fluoride during the step (b) was 99% of the theoretical value. Based on the above-mentioned results, it was determined that the mixture substantially maintained the form of particulate during the step (b).

The supply of sulfuric acid was completed 150 minutes after the start of supplying. At this time point, the conversion ratio of calcium fluoride was calculated to 50%.

Step (c)

Then, the step (c) was conducted in accordance with the same procedures as those in Example 3. It was visually confirmed that the mixture maintained the solid (that is, granular) state, causing no occurrence of adhesive material inside the reactor during the step (c).

The generation of hydrogen fluoride was stopped 100 minutes after the start of the step (c). At this time point, heating and stirring were completed. The conversion ratio of calcium fluoride was calculated to 98% based on the amount of generated hydrogen fluoride.

Example 6

This Example is a modified example of Example 5, in which the flow rate of sulfuric acid was increased.

This Example was conducted by use of the same reactor as that used in Example 5 (reactor B).

Step (b)

The step (b) was conducted in accordance with the same procedures as those in Example 5 except that the flow rate of sulfuric acid was 16.7 g/min (0.013 mol/min relative to 1 mol of the calcium fluoride particles). It was visually confirmed that the mixture maintained the solid (that is, granular) state, causing no occurrence of the pasty state inside the reactor during the step (b). Also, rapid rise and hunting in the torque and the current value of the stirring blade were not observed during the step (b). In addition, as a result of monitoring the amount of generated hydrogen fluoride, it was confirmed that the amount of generated hydrogen fluoride during the step (b) was 99% of the theoretical value.

Based on the above-mentioned results, it was determined that the mixture substantially maintained the form of particulate during the step (b).

The supply of sulfuric acid was completed 75 minutes after the start of supplying. At this time point, the conversion ratio of calcium fluoride was calculated to 40%.

Step (c)

Then, the step (c) was conducted in accordance with the same procedures as those in Example 5. It was visually confirmed that the mixture maintained the solid (that is, granular) state, causing no occurrence of adhesive material inside the reactor during the step (c).

The generation of hydrogen fluoride was stopped 225 minutes after the start of the step (c). At this time point, heating and stirring were completed. The conversion ratio of calcium fluoride was calculated to 98% based on the amount of generated hydrogen fluoride.

The conditions for conducting Examples 1 to 6 and the results are shown in Tables 1 and 2. In Tables 1 and 2, weights of $CaF_2$ particles and sulfuric acid are both net weights of $CaF_2$ and $H_2SO_4$, and "molar ratio" means a molar ratio of sulfuric acid/calcium fluoride used in the Examples. A case where the mixture inside the reactor substantially maintained the form of particulate during each step is shown as "Yes," and a case where the mixture did not maintain the form of particulate during each step is shown as "No."

sulfuric acid in the step (a) of Example 2 where the reaction was conducted in one stage. However, the time spent from starting the supplying of sulfuric acid until stopping the generation of hydrogen fluoride was shorter in Example 3 than in Example 2.

The conversion ratio of calcium fluoride at the end of supplying sulfuric acid in the step (b) was 50% in Example 3. On the other hand, the conversion ratio at the end of supplying sulfuric acid in the step (b) was 40% in Example 4. The time spent until stopping the generation of hydrogen fluoride in the step (c) was 40 minutes in Example 3. On the other hand, the time spent until stopping the generation of hydrogen fluoride in the step (c) was 100 minutes in Example 4. It is considered to be because the flow rate of sulfuric acid in Example 4 was higher than that in Example 3, thereby unreacted sulfuric acid had a tendency to accumulate in the mixture inside the reactor in the step (b) of Example 4.

Also, the conversion ratio of calcium fluoride at the end of supplying sulfuric acid in the step (b) was 50% in Example 5. On the other hand, the conversion ratio at the end of supplying sulfuric acid in the step (b) was 40% in Example 6. The time spent until stopping the generation of hydrogen fluoride in the step (c) was 100 minutes in Example 5. On the other hand, the time spent until stopping the generation of hydrogen fluoride in the step (c) was 225 minutes in Example 6. It is considered to be because the flow

TABLE 1

| | | Raw material | | | Step (a) | | | |
| | Reactor | $CaF_2$ weight (g) | $H_2SO_4$ weight (g) | Molar ratio | Temperature (° C.) | Sulfuric acid flow rate (g/min) | Solid state | conversion ratio (%) |
|---|---|---|---|---|---|---|---|---|
| Example 1 | A | 500 | 625 | 0.995 | 120 | 31.25 | yes | 98 |
| Example 2 | A | 1000 | 1250 | 0.995 | 120 | 25 | yes | 98 |

TABLE 2

| | | Raw material | | | Step (b) | | | Step (c) | | |
| | Reactor | $CaF_2$ weight (g) | $H_2SO_4$ weight (g) | Molar ratio | Temperature (° C.) | Sulfuric acid flow rate (g/min) | Solid state | Temperature (° C.) | Solid state | conversion ratio (%) |
|---|---|---|---|---|---|---|---|---|---|---|
| Example 3 | A | 1000 | 1250 | 0.995 | 80 | 25 | yes | 130 | yes | 98 |
| Example 4 | A | 1000 | 1250 | 0.995 | 80 | 62.5 | yes | 130 | yes | 98 |
| Example 5 | B | 1000 | 1250 | 0.995 | 80 | 8.3 | yes | 130 | yes | 98 |
| Example 6 | B | 1000 | 1250 | 0.995 | 80 | 16.7 | yes | 130 | yes | 98 |

It can be seen from the results of Examples 1 to 6 that the reaction progressed while substantially maintaining the form of particulate over the whole process in both cases where the reaction of calcium fluoride and sulfuric acid was conducted in one stage (Examples 1 and 2) and where the reaction was conducted in two stages (Examples 3 to 6).

The time required for supplying sulfuric acid in the step (b) of Example 3, where the reaction was conducted in two stages, was longer than the time required for supplying rate of sulfuric acid in Example 6 was higher than that in Example 5, thereby unreacted sulfuric acid had a tendency to accumulate in the mixture inside the reactor in the step (b) of Example 6.

INDUSTRIAL APPLICABILITY

The method for producing hydrogen fluoride of the present invention can drastically ease practical restriction on calcium fluoride source, and achieve stable supply of raw materials and a reduction of raw material cost.

In addition, the method can prevent the occurrence of the pasty state which may adversely affect mechanical load change and durability of the apparatus, as well as corrosion by sulfuric acid in the pasty state. As a result, the method can reduce apparatus cost. The method of the present invention can be conducted at lower temperature in a shorter time relative to the conventional methods, and drastically reduce energy cost.

REFERENCE SIGNS LIST

1 Preliminary reactor
3 Introduction pipe
5 Rotary kiln
7 Continuous reactor

The invention claimed is:

1. A method for producing hydrogen fluoride by reacting calcium fluoride and sulfuric acid, the method comprising:
 (b) mixing and reacting calcium fluoride and sulfuric acid such that a mixture comprising calcium fluoride particles and sulfuric acid is substantially maintained in a particulate form to obtain hydrogen fluoride, wherein sulfuric acid is supplied to the calcium fluoride particles at a flow rate of 0.002 to 0.07 mol/min relative to 1 mol of calcium fluoride at the start of the reaction in such an amount that a molar ratio of sulfuric acid/calcium fluoride is 0.9 to 1.1; and
 (c) mixing and reacting the intermediate product mixture with itself under a temperature condition higher than that in the step (b) to obtain hydrogen fluoride.

2. The method according to claim 1, wherein the mixing is conducted in the step (b) by use of an apparatus having an attainment degree of mixing of 0.1 or more one minute after a start of the mixing.

3. The method according to claim 1, wherein the step (b) is conducted at a temperature of 0 to 170° C.

4. The method according to claim 1, wherein the step (c) is conducted at a temperature of 80 to 500° C.

5. The method according to claim 1, wherein the calcium fluoride particles have a specific surface area of 0.5 to 30 $m^2/g$.

* * * * *